United States Patent [19]

Masuko et al.

[11] Patent Number: 4,850,291
[45] Date of Patent: Jul. 25, 1989

[54] MOVABLE TYPE OF DEVICE FOR FERTILIZING THE SOIL BY PIERCING A NOZZLE INTO THE SAME

[75] Inventors: Toshikazu Masuko; Teruo Masuko, both of Funabashi; Shunro Hirao, Tokyo, all of Japan

[73] Assignee: Mac Engineering Co., Ltd., Japan

[21] Appl. No.: 168,537

[22] Filed: Mar. 8, 1988

Related U.S. Application Data

[63] Continuation of Ser. No. 839,049, Mar. 12, 1986, abandoned.

[30] Foreign Application Priority Data

| Mar. 14, 1985 | [JP] | Japan | 60-050857 |
| Feb. 10, 1986 | [JP] | Japan | 61-17971[U] |
| Feb. 10, 1986 | [JP] | Japan | 61-17972[U] |
| Feb. 10, 1986 | [JP] | Japan | 61-17973[U] |

[51] Int. Cl.$^4$ ............... A01C 15/02; A01C 15/04
[52] U.S. Cl. ..................... 111/7.2; 111/118
[58] Field of Search .................. 111/7.1–7.4, 111/6, 7, 89; 405/269; 406/128, 109, 85, 153, 50, 62, 66, 64, 67, 68, 39, 118; 222/636

[56] References Cited

U.S. PATENT DOCUMENTS

| 1,123,155 | 12/1914 | Woodley | 406/50 |
| 1,771,497 | 7/1930 | Mayr | 406/66 |
| 2,083,153 | 6/1937 | Irish | 111/7.1 |
| 2,565,546 | 8/1951 | Colburn | 406/68 |
| 2,619,055 | 11/1952 | Abel et al. | 111/7.4 |
| 3,175,515 | 3/1965 | Cheely | 406/153 |
| 3,546,886 | 12/1970 | Jones et al. | 111/7.4 |
| 3,799,622 | 3/1974 | Hek | 406/109 |
| 3,886,874 | 6/1975 | Platz | 111/7.4 |
| 4,155,488 | 5/1979 | Ware | 222/636 |
| 4,566,543 | 1/1986 | Kotami | 111/6 |
| 4,570,553 | 2/1986 | Ito | 111/6 |
| 4,624,196 | 11/1986 | Zinck | 111/7.2 |

FOREIGN PATENT DOCUMENTS

| 2716456 | 8/1978 | Fed. Rep. of Germany | 111/7.4 |
| 1165262 | 7/1985 | U.S.S.R. | 111/7.1 |

Primary Examiner—Danton D. DeMille
Attorney, Agent, or Firm—Cushman, Darby & Cushman

[57] ABSTRACT

A movable type of device for fertilizing the soil by piercing a nozzle into the same comprises a moving support which is adapted to lift, retain and move a device for fertilizing the soil by piercing a nozzle into the same. This device comprises a nozzle for injecting a specified amount of fertilizer from its tip end portion into the soil by use of a blast of air, a nozzle striking hammer for applying an impact force to the nozzle to drive the same into the soil, a nozzle drawing-out for drawing the pierced nozzle out of the soil, a blast source for causing a blast of air to be produced, and a fertilizer metering chamber for metering the fertilizer. The fertilizer metering chamber includes a fertilizer holding chamber which is arranged to temporarily hold therein the specified amount of fertilizer supplied from a fertilizer storage chamber. The fertilizer is suitably fed into a passage of the device for being injected into the soil from the tip end portion of the nozzle.

3 Claims, 10 Drawing Sheets

MOVABLE TYPE OF DEVICE FOR FERTILIZING THE SOIL BY PIERCING A NOZZLE INTO THE SAME

This is a continuation of application Ser. No. 839,049, filed Mar. 12, 1986, which was abandoned upon the filing here.

BACKGROUND OF THE INVENTION

1. (Field of the Invention)

The present invention relates to a device for fertilizing the soil by striking a fertilizing nozzle into the same, in which a nozzle is driven into the soil, whereby a specified amount of fertilizer is blown onto an underground soil portion around the root of, for example, a plant in an orchard, tea plantation, etc. by using a blast of air, to thereby fertilize such a soil portion, and, more particularly, to said device of movable type which is movable and yet simple in structure.

2. (Description of the Prior Art)

Conventionally, when a fertilizer is imparted to a plant in an orchard, tea plantation, etc., it was in some cases scattered around the roots of, for example, a fruit tree. In some cases, the soil portion in the vicinity of such roots, was turned up to apply a fertilizer. Further, the soil was in some cases turned over to apply a fertilizer into the soil. No device which is capable of mechanically conducting the above-mentioned old fertilizing method, however, has been adopted.

In the above-mentioned prior art, a large amount of time was required for the fertilizer components to penetrate into the soil and exhibit its effect. Further, the fertilizer inconveniently was carried away by, for example, rain water. Further, a considerably large amount of time and labour were required for turning up or over the soil around the roots of a fruit tree, failing to perform a smooth and quick fertilization.

SUMMARY OF THE INVENTION

The present invention has been achieved under the above-mentioned circumstances and the object thereof is to provide a movable type of device for fertilizing the soil by piercing a fertilizing nozzle into the same, which can solve the above-mentioned problems inherent in the prior art, and which is also capable of not only mechanically performing the piercing of a fertilizing nozzle into the soil to fertilize the same but also being moved to quickly and smoothly perform such piercing and fertilizing with respect to, for example, a fruit tree.

To attain the above object, according to the present invention, there is provided a movable type of device for fertilizing the soil by piercing a fertilizing nozzle into the same, comprising a nozzle which is struck into the soil to cause a specified amount of fertilizer to be blown onto an underground soil portion by a blast of air, a fertilizer metering means which is intended to meter the specified amount of fertilizer, a blast means which is intended to cause the blast of air to occur, a nozzle striking means which is intended to apply an impact force to the nozzle to cause the same to be driven into the soil, a nozzle drawing-out means which is intended to draw the pierced nozzle out of the soil, said nozzle being operatively connected to said fertilizer metering means, blast means, nozzle striking means and nozzle drawing-out means, and a moving means which is capable of lifting said nozzle and other said means and holding to move the same.

According to the invention, the device as a whole is lifted by the above-mentioned moving means and moved by the same to any given place where, for example, a fruit tree is planted. Thereafter, said nozzle is pierced into the soil by the nozzle striking means, whereby a specified amount of fertilizer is injected into the soil by using a blast of air to fertilize the same. After injection, the nozzle is drawn out of the soil and is moved to the next place to be pierced into the new soil for fertilizing the same sequentially.

Other objects, features, and advantages will become apparent from the following description which is made in conjunction with the accompanying drawings in which.

DESCRIPTION OF THE PREFERRED EMBODIMENTS

An embodiment of the invention will now be described with reference to the accompanying drawings.

Figure 1:
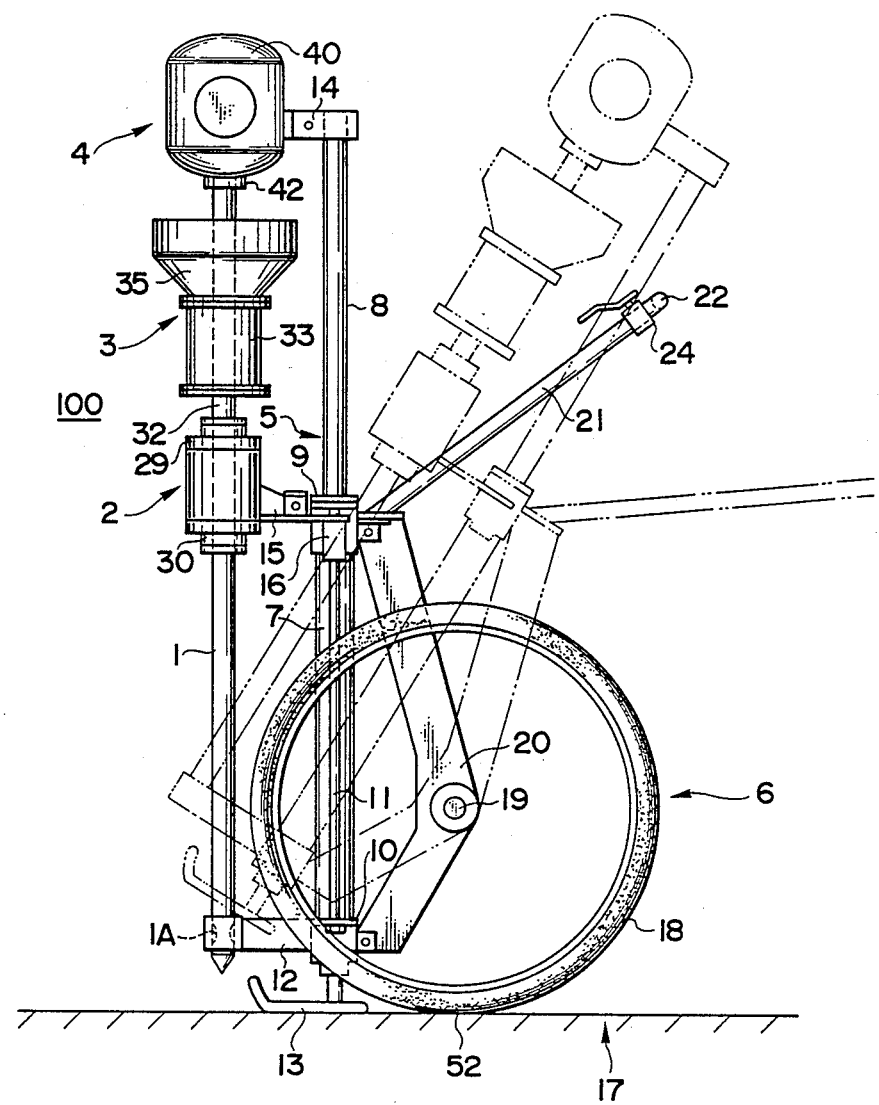
FIG. 1 is a front view illustrating the entire construction of a movable by-piercing-a-nozzle fertilizing device as a whole according to an embodiment of the invention.
Figure 2:
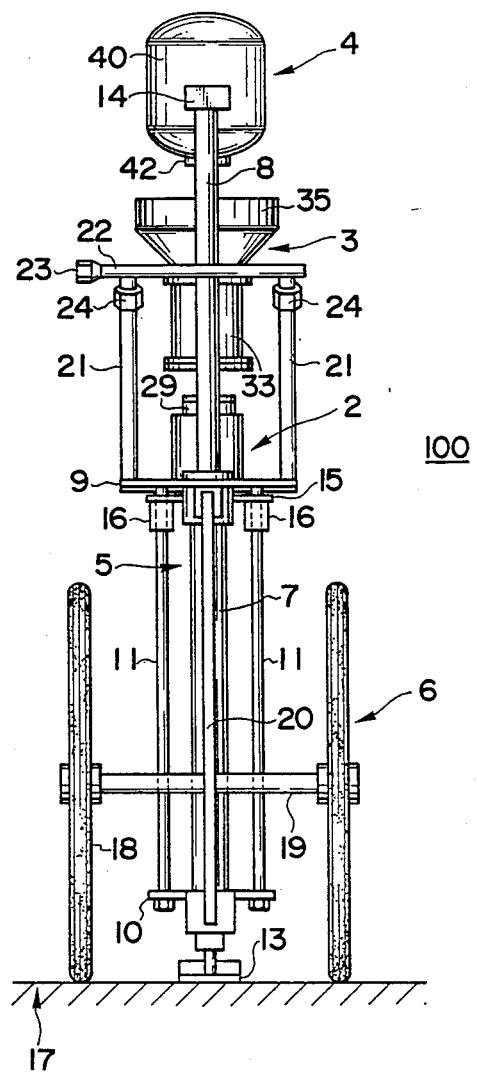
FIG. 2 is a side view of FIG. 1.

The entire structure of a movable type of device 100 for fertilizing the soil by piercing a fertilizing nozzle into same is illustrated in FIGS. 1 and 2.

A pipe-like nozzle 1 the tip end portion of which is tapered or sharpened is vertically disposed on the surface of the soil. Fertilizer injecting bores 1A are provided at the tip end portion of the nozzle 1.

A lower bracket 30 of a nozzle striking means 2 is connected to a flanged portion (FIG. 3) at the upper end of the nozzle 1. Further, a ventilation pipe 32 of the fertilizer metering means 3 is connected via a flange to an upper bracket 29 of the nozzle striking means 2. To a top portion of the ventilation pipe 32 is connected an injection pipe 42 of a blast means 4. In this embodiment, a nozzle drawing-out means 5 is comprised of a cylinder 7, and a rod 8 connected to a piston (not shown) allowed to slide within the cylinder 7. A guiding shaft 11 is mounted between a supporting member 9 and a supporting plate 10, both of which are respectively connected to an upper end portion and a lower end portion of the cylinder 7. To the lower end portion of the cylinder 7 is secured a grounding plate 13 contractible with the ground surface 17. A supporting metal 12 is secured to the lower end portion of the cylinder 7, which metal 12 slidably holds the tip end portion of the nozzle 1. Further, a fastening metal 14 is fixedly held in place by the blast means 4 and is connected to an upper end portion of the rod 8. A guide bush 16 is fixed on a bracket 15 secured to the nozzle striking means 2, which guide bush 16 is slidably engaged with the guiding shaft 11.

A moving means 6 is comprised of wheels 18 which are disposed in contact with the ground surface 17, an arm member 20 having its intermediate portion pivoted on a wheel shaft 19 for the wheels 18, and a pair of handle pipes 21 which are connected at one end to an upper end portion of the arm member 20. The upper end portion of the arm member 20 is connected to the upper end portion of the cylinder 7. The lower end portion thereof is also connected to the lower end portion of the cylinder 7. A grip pipe 22 is installed between the pair of handle pipes 21 (FIG. 2). A compressed gas supply port 23 is provided at the grip pipe 22, which port 23 is connected to a compressed gas source not shown. Within each handle pipe 21, there is disposed an operation valve 24 for opening and closing the passage of the compressed gas sent from the grip pipe 22. Although not shown, the compressed gas which has been sent from the compressed gas supply port 23 into the handle pipes 21 as the operation valve 24 opens is supplied into the nozzle striking means 2, blast means 4 and cylinder 7 by way of a pipe or tube (not shown).

Next, respective structures of the nozzle striking means 2, fertilizer metering means 3 and blast means 4 will now be described.

Figure 3:
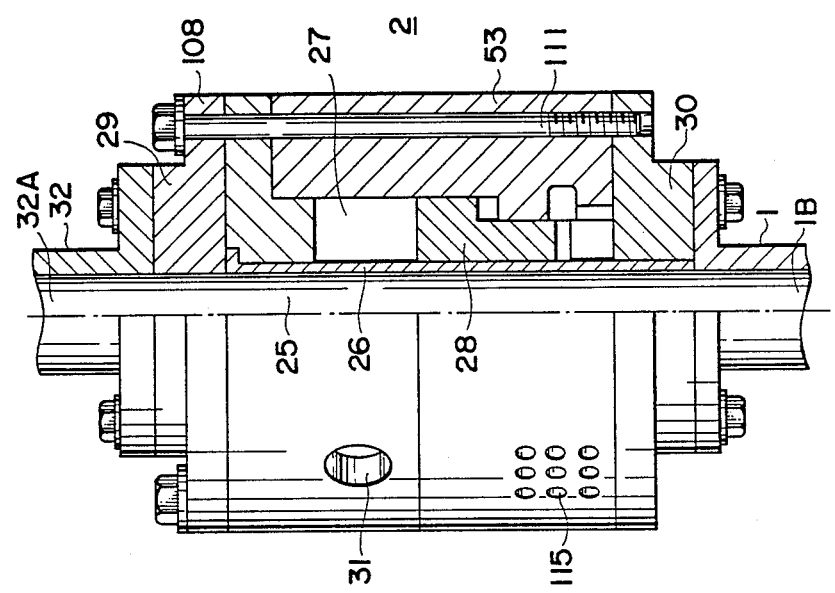
FIG. 3 is a sectional view schematically illustrating the structure of a nozzle striding means according to the embodiment.

First of all, the nozzle striking means will be described with the use of FIG. 3.

A bush 26 which forms a passage 25 located at the central part of the nozzle striking means 2 is installed between upper and lower brackets 29 and 30. The upper bracket 29 is connected, via a flange 108, to the ventilation pipe 32. The lower bracket 30 is connected via a flange to the nozzle 1. Thus, the ventilation pipe 32, passage 25, and passage 1B of the pipe-like nozzle 1 are allowed to communicate with each other. The upper and lower brackets 29, 30 are integrally connected to a main body 53 by means of bolts 111. A suitable spacing 27 is formed between the inner periphery of the main body 53 and the outer periphery of the bush 26 and, within this spacing 27, a hammer 28 is slidably supported. A compressed gas inlet 31 formed in the main body 53 is communicated with the hammer 28. The hammer 28 is vertically moved due to the entry and discharge of the compressed gas. The gas discharged due to this vertical movement of the hammer 28 is released outside the spacing 27 via discharge apertures 115 of the main body 53 while being silenced. An impact force thus is applied onto the nozzle 1 via the lower bracket 30 by way of the vertical movement of the hammer 28 due to the action of the compressed gas.

As shown in FIG. 1, the nozzle 1 is formed such that its tip end portion is so sharpened as to be easily driven into the soil. The nozzle 1 is formed in the vicinity of its tip end with fertilizer injecting bores 1A which are communicated with a passage 1B. The grounding plate 13 is contacted with the ground surface 17 to support the nozzle drawing-out means 5. The supporting metal 12 which is fixed on the cylinder 7 slidably supports the tip end portion of the nozzle 1. A guide shaft 11 is mounted between the supporting member 9 and supporting plate 10 respectively provided on the upper and lower end portions of the cylinder 7, in parallel with the nozzle 1. The rod 8 connected to a piston (not shown) in the cylinder 7 is upwardly of the cylinder 7.

The guide bushes 16 which are slidably inserted over the guiding shafts 11 are fixed on the bracket 15 secured to the main body 53 of the nozzle striking means 2. Further, the fastening metal 14 is connected to the upper end portion of the rod 8 and is fixed to the blast means 4.

The operation of this embodiment will now be described.

When the gas sent from the compressed gas source not shown acts on the hammer 28 of the nozzle striking means 2, the nozzle 1 is gradually driven, by application thereto of the impact force by the hammer 28, into the soil while it is being guided by the supporting metal 12. The nozzle striking means 2 causes the nozzle 1 to be vertically driven into the soil while its guide bush 16 is being guided by the guiding shaft 11. As the nozzle striking means 2 is moved downwards, both the blast means 4 and the fertilizer metering means 3 are also moved downwards. The rod 8 which is connected to the blast means 4, also, is moved downwards while it is kept inserted in the cylinder 7. At this time, of course, the cylinder 7 is so controlled by a control means not shown as to discharge the compressed air so that the smooth movement of the rod 8 may be made without any hindrance.

When the nozzle 1 is driven into the soil by a specified length, a specified amount of fertilizer which has been metered in the fertilizer metering means 3 is sent toward the tip end of the nozzle 1 by the blast of air from the blast means 4. Thus, it is ejected from the fertilizer injection bores 1A and thus is injected into the soil. When the fertilizer injection is completed, a compressed gas is supplied into the cylinder 7 by the control means not shown. For this reason, the rod 8 is moved upwards, so that the blast means 4, the fertilizer metering means 3, the nozzle striking means 2 and the nozzle 1 are lifted upwards. Since the rod 8 is smoothly operated by being supported by the cylinder 7 and, at the same time, the nozzle striking means 2 is moved by being guided by the guiding shaft 11, the vertical movement of the nozzle 1 is effected smoothly and speedily. Further, if the impact force of the nozzle striking means 2 and the pressure of the cylinder 7 are set to suitable magnitudes respectively, then the nozzle 1 will be struck into and drawn up at the desired rate.

Figure 5:
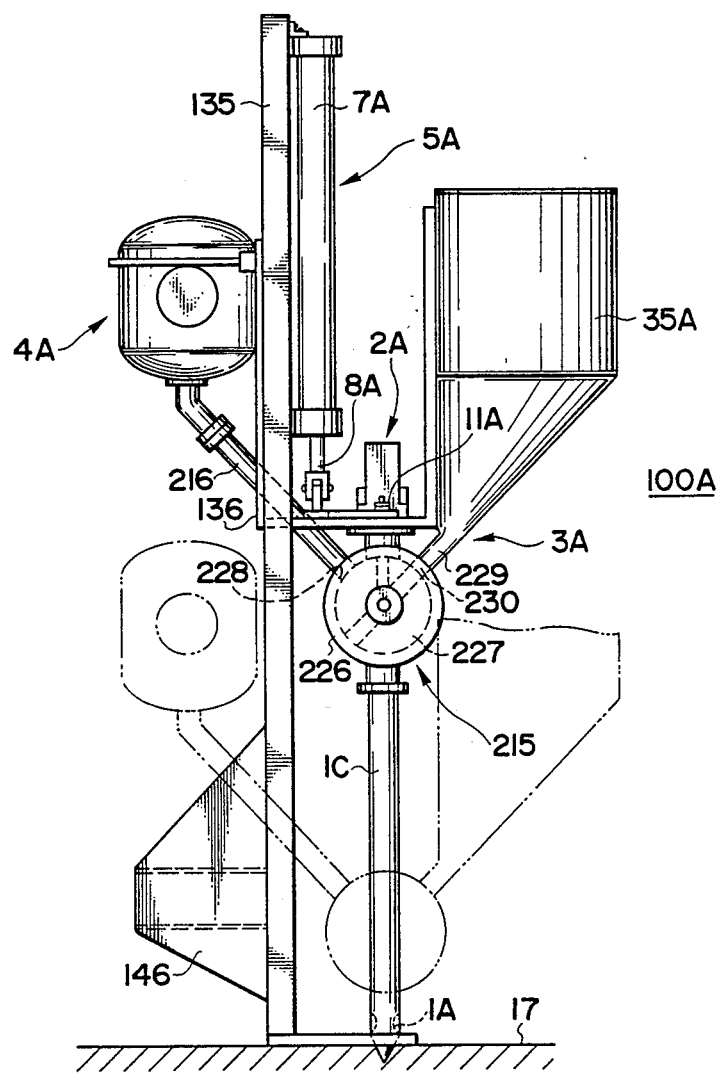
FIG. 5 is a front view of this second embodiment of the invention.
Figure 6:
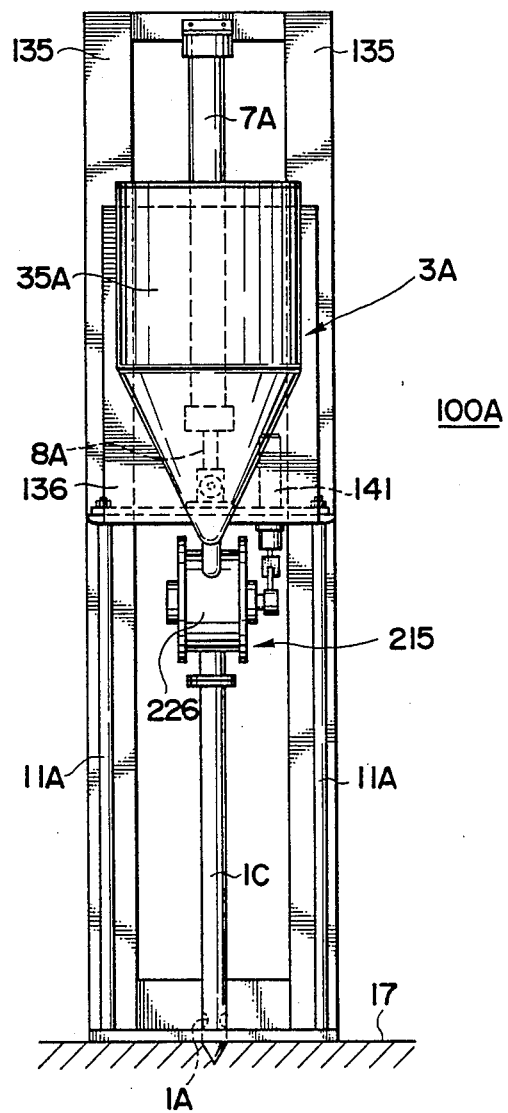
FIG. 6 is a side view of FIG. 5.

FIGS. 5 and 6 illustrate a movable type of by-piercing-a-nozzle fertilizing device 100A according to another embodiment of the invention wherein a blast means 4A, fertilizer metering means 3A, and nozzle striking means 2A are not disposed on the same axis as that of a nozzle 1C.

Figure 4:
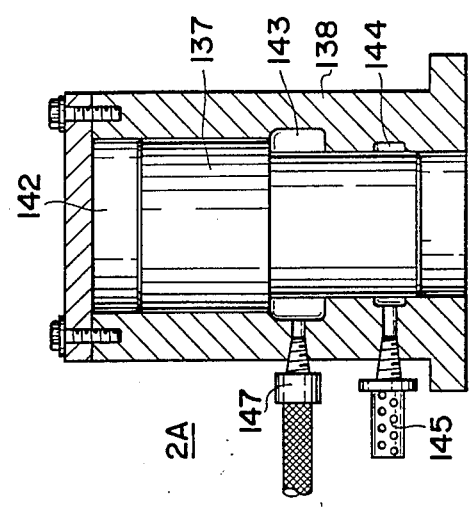
FIG. 4 is a sectional view of the structure of a nozzle striking means used in the embodiment shown in FIGS. 5 and 6.

A movable frame 136 is slidably supported on a pair of support columns 135 which are disposed on the ground surface 17 in parallel with each other. A nozzle drawing-out means 5A is fixed at one side (upper end portion) to the support columns 135. To the movable frame 136 is connected rod 8A of a cylinder 7A of the nozzle drawing-out means 5A. Further, on the movable frame 136 is installed a nozzle striking means 2A. Fixed on the movable frame 136 are also the blast means 4A and a fertilizer storage chamber 35A of the fertilizer metering means 3A. The movable frame 136 is adapted to be vertically moved by being guided by the guiding shafts 11A. Further, an outer case 226 of the fertilizer metering means 3A is connected via a flange to a portion beneath the movable frame 136. It is to be noted here that the device of this second embodiment is also constructed such that the impact force of the hammer 137 of the nozzle striking means 2A shown in FIG. 4 is applied onto the outer case 226. To an inner case 227 which is supported by the outer case 226 in such a manner as to be rotatable by an air cylinder 141 (FIG. 6), there are connected the blast means 4A and the fertilizer storage chamber 35A. Thereby, a specified amount of fertilizer is temporarily stored or held in the inner case 227 and, at the same time, a blast of air is introduced into the same. A pipe-like nozzle 1C is connected via a flange to the outer case. It is disposed on the ground surface 17 in parallel with the support columns 135. It is to be noted here that the nozzle 1C is similarly formed with the fertilizer injection bores 1A as in the preceding first embodiment.

As shown in FIG. 4, the nozzle striking means 2A comprises a hammer 137 slidably supported by a case 138 constituting a main body of the nozzle striking means, and air cushion chambers 142, 143 and 144. To the air cushion chamber 143 is screwed a compressed gas supply pipe 147 through which a compressed gas is supplied to the chamber 143. To the air cushion chamber 144 is screwed a discharge pipe 145 having a silencer. The entry and discharge of the compressed gas cause the hammer 137 to be vertically moved.

In this second embodiment as well, the nozzle 1C is driven into the soil by operation of the nozzle striking means 2A as in the preceding first embodiment. At this time, the movable frame 136 is moved together with the nozzle striking means 2A, blast means 4A and fertilizer metering means 3A as indicated by two-dot chain lines. Although the cylinder 7A is held in place by the support columns 135 as it is, the rod 8A is drawn out of the cylinder 7A as the movable frame 136 is moved.

The upward drawing of the nozzle 1C is effected by supplying a compressed gas into the cylinder 7A of the nozzle drawing-out means 5A. In this second embodiment as well, the striking and drawing of the nozzle 1C into and out of the soil are smoothly and speedily performed, whereby a fertilizer involved is reliably injected into the soil.

In FIG. 5, a tractive bracket 146 is fixed to the support columns 135. To the tractive bracket 146 is connected a tractor (for example, automobile) not shown so as to enable the fertilizing device 100A as a whole to be quickly conveyed to any given place. The nozzle striking means 2, 2A and the nozzle drawing-out means 5, 5A are not limited to the above-mentioned embodiments, but the invention permits the use of any other means which is directly or indirectly connected to the nozzle 1, 1C and which has oil or gas pressure, mechanical force, or electric force capable of applying an impact force upon the nozzle to cause it to be driven into the soil and, at the same time, reliably drawing it out of the soil. It should be noted here that the guiding members such as the guiding shafts 11, 11A desirably are each formed into a structure having a resistance to slide which is as low as possible.

The structure and action of the fertilizer metering means 3 shown in FIGS. 1 and 2 are illustrated in FIGS. 7 to 11.

Figure 7:
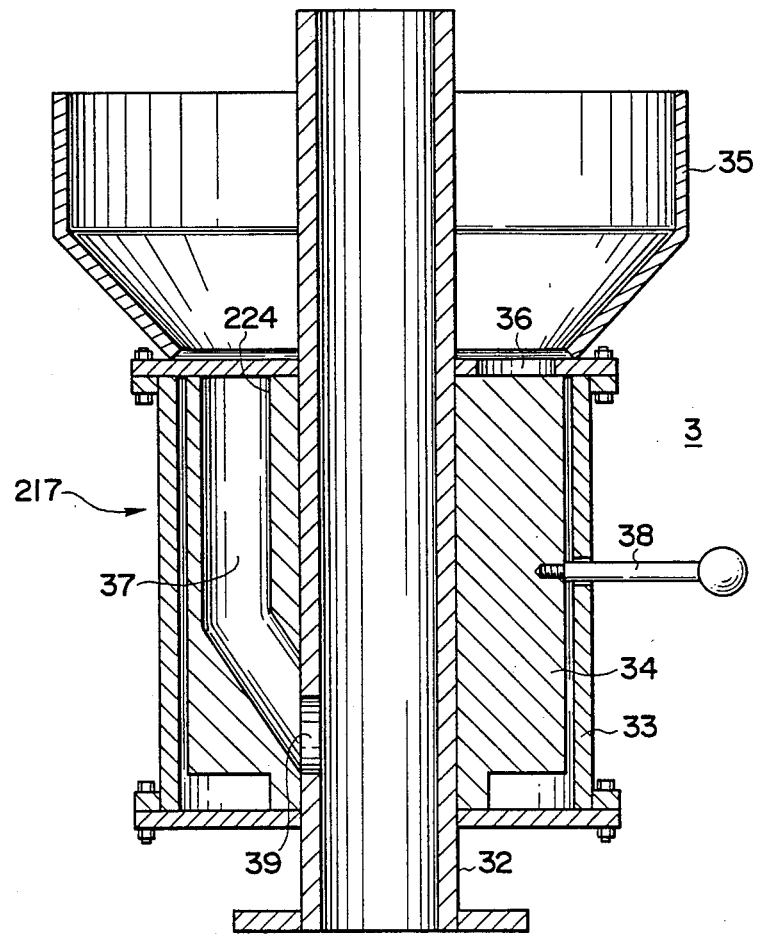
FIG. 7 is a sectional view of a fertilizer metering means according to the embodiment of the invention.

In FIG. 7, the ventilation pipe 32 is disposed at the central part of the means 3 and, around the outer periphery thereof, a fertilizer holding means 217 is provided in such a manner as to enclose that pipe. Namely, the fertilizer holding means 217 comprises a cylindrical hollow valve chamber 33 forming a closed spacing and a fertilizer holding rotor 34 which is received in the valve chamber 33 and which is closely engaged with the outer periphery of the ventilation pipe 32 in such a manner that it may be rotatable about the axis thereof. Further, a fertilizer storage chamber 35 is connected to the fertilizer holding means 217. The fertilizer is supplied thereinto via inlet bores 36 formed in the top of the valve chamber 33 and capable of being communicated with the closed spacing chamber. The ventilation pipe 32 is similarly formed, at the outer periphery of its lower end portion, with through bores 39 capable of being communicated with the closed spacing chamber.

Figure 8:
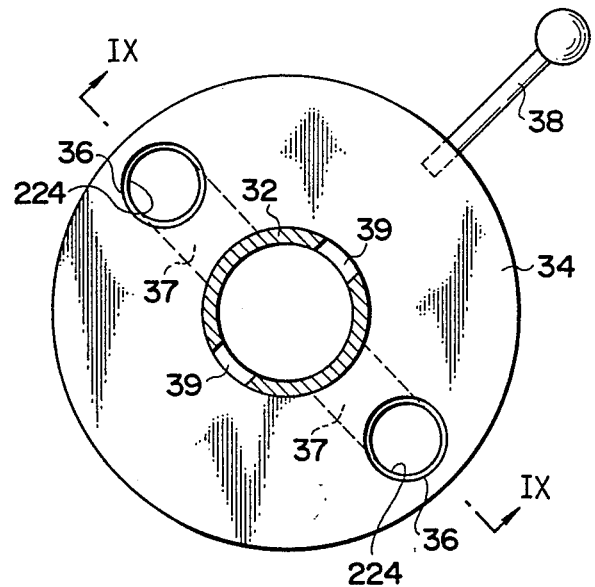
FIG. 8 is a top view for explaining the structure and action of a main part of the embodiment.
Figure 9:
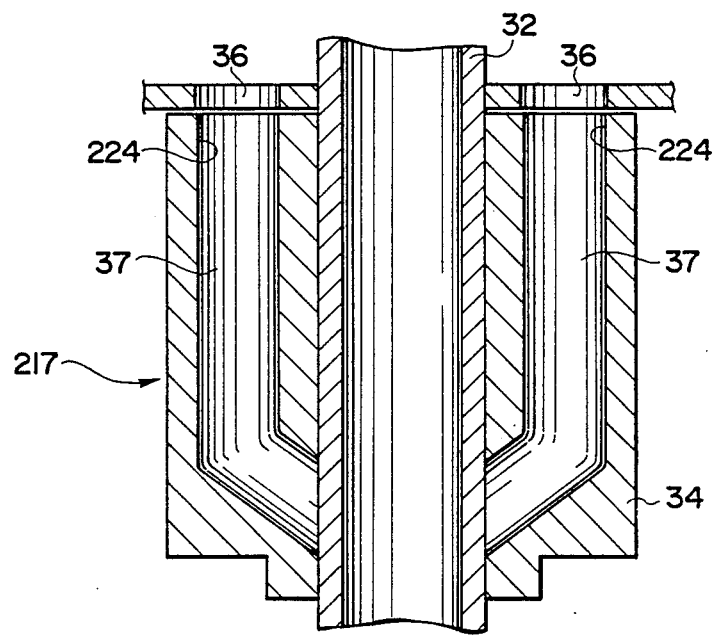
FIG. 9 is a sectional view taken along the line III—III of FIG. 8.

As shown in FIGS. 8 and 9 as well, the fertilizer holding rotor 34 is formed into a cylindrical shape, and is formed with a pair of metering chambers which extend from the upper surface of the rotor 34 and passes through the wall thickness portion thereof to open at the inner periphery thereof, in such a manner that they oppose each other. The total volume of these metering chambers 37 corresponds to a specified amount of fertilizer to be injected from the nozzle 1 into the soil. An opening 224 of each metering chamber 37 which resides at the upper-surface side thereof is provided at a position in which it can be communicated with the corresponding inlet bore 36. These opening and bore can be brought into alignment with each other by operating a handle 38 attached to the fertilizer holding rotor 34, as shown in FIG. 8. Although in FIG. 8 the opening 224 and inlet bore are illustrated as if their diameters were different from each other, this illustration is made so for convenience of explanation. Actually, both diameters are made equal. When the openings 224 and their corresponding inlet bores 36 are allowed to coincide with each other, the through bores of the ventilation pipe 32 are located at positions displaced 90° from the openings 224 and inlet bores 36. Thus, the metering chambers 37 and the through bores are not communicated with each other.

The action of the fertilizer holding means 217 will now be described.

As shown in FIGS. 8 and 9, by operating the handle 38, the fertilizer holding rotor 34 is rotated to cause the openings 224 of the metering chamber 37 to communicate with the inlet bores for entry of fertilizer. A specified amount of fertilizer is thereby supplied into the metering chambers 37 from the fertilizer storage chamber 35 and thus is filled therein.

Figure 10:
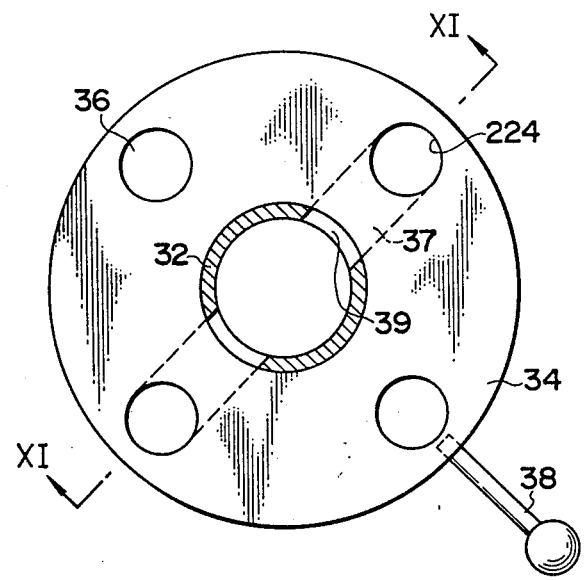
FIG. 10 is a top view for explaining the action of the embodiment.
Figure 11:
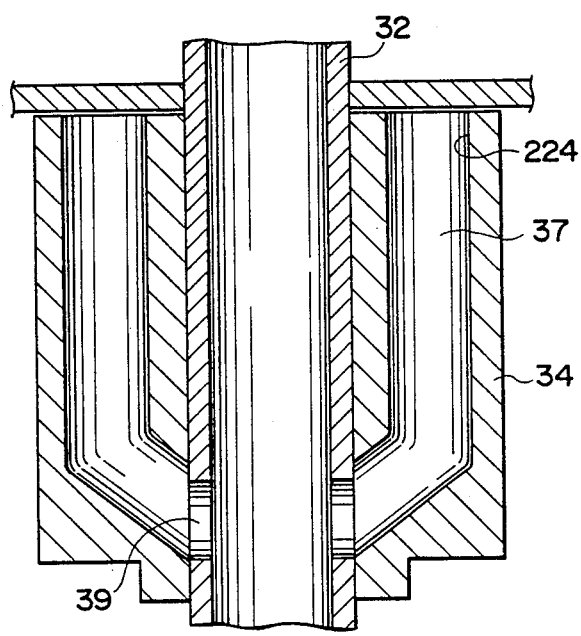
FIG. 11 is a sectional view taken along the line V—V of FIG. 10.

Next, as shown in FIGS. 10 and 11, when the handle 38 is operated to cause the fertilizer holding rotor 34 to be rotated 90° from its original position, the metering chambers 37 are communicated with the through bores 39 of the ventilation pipe 32. At the same time, the inlet bores 36 are closed by the upper surface of the fertilizer holding rotor 34. The masses of fertilizer within the metering chambers 37 are introduced from the through bores 39 into the ventilation pipe 32. On the other hand, a blast of air ejected from the blast means 4 is caused to pass through the ventilation pipe 32, whereby the fertilizer is sent downwards together with the blast of air and is quickly fed into the nozzle 1.

Figure 12:
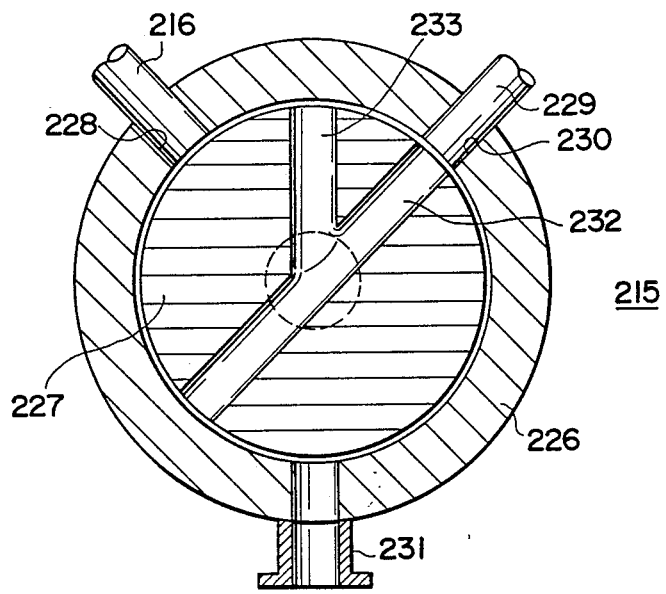
FIGS. 12 and 13 are each a sectional view, taken at right angles to the rotating shaft, of the structure and action of another embodiment of the invention.
Figure 13:
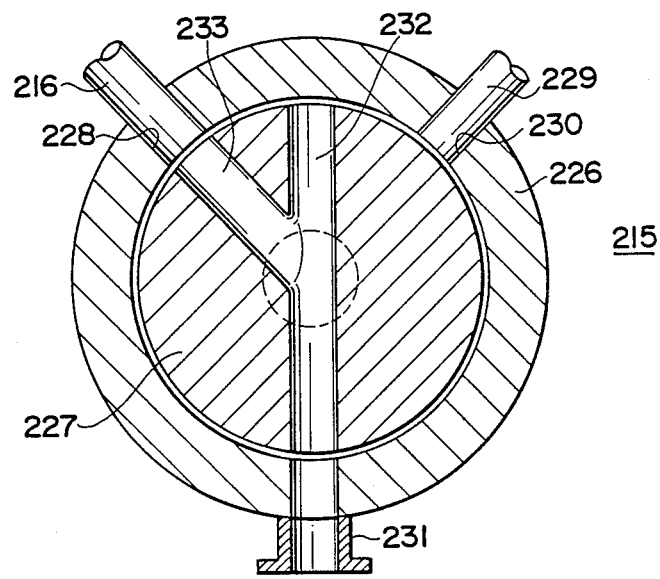

FIGS. 12 and 13 illustrate a fertilizer holding means 215 which is used in the movable type of by-piercing-a-nozzle fertilizing device 100A shown in FIG. 5.

The fertilizer holding means 215 comprises the outer case 226 and the inner case 227 which is rotatably supported within the same. As shown in FIGS. 12 and 13 as well, the outer case 226 is formed with a bore 228 communicated with a pipe 216 connected to the blast means 4A as well as a bore 230 communicated with a pipe 229 connected to the fertilizer storage chamber 35A, both said bores 228 and 230 thus being capable of being communicated with the side of the inner case 227. The bores 228 and 230 are formed such that both intersect at an intersection angle of 90°. The outer case 226 is connected with the nozzle 1C via a flange and is also provided with an outlet pipe 231 communicated with the interior thereof. The inner case 227 is so formed as to be rotatable within the outer case 226 by a rotating means not shown. It is formed with a metering chamber 232 which diametrically passes through it, as well as a passage 233 through which a blast of air is allowed to pass. The metering chamber 232 and the passage 233 are formed such that both intersect at an intersection angle of, for example, 45° which is smaller than 90° at which said bores 228 and 230 intersect.

The action of this embodiment will now be described.

When the metering chamber 232 of the inner case 227 and the bore 230 of the outer case 226 are brought into alignment with each other by rotating the inner case 227 as shown in FIG. 12, the fertilizer is supplied from the fertilizer storage chamber 35A into the fertilizer metering chamber 232. In this case, since the outlet pipe 231 is not communicated with the metering chamber 232 (because the outlet pipe 231 is formed at an intermediate position between the bores 228 and 230), the fertilizer is not fed to the outlet pipe 231 but is allowed to stay in the metering chamber 232. Nor is the passage 233 communicated with the bore 228 at the side of the blast means 4A. When the inner case 227 is rotated through an angle of 45° as shown in FIG. 13, the metering chamber 232 is allowed to communicate with the outlet pipe 231 and, at the same time, the passage 233 is also allowed to communicate with the bore 228. Accordingly, the blast of air from the blast means 4A rushes toward the outlet pipe 231 by way of the passage 232, so that the fertilizer in the metering chamber 232 is sent out from the outlet pipe 231 into the nozzle 1C.

As has been described above, by using the fertilizer holding means 215 or 217, a specified amount of fertilizer is first temporarily held therein and the is reliably sent out into the nozzle 1 or 1C.

Although its two embodiments have been described above, the fertilizer holding means is not limited to such ones. The invention permits the use of any other structure of holding means which is capable of first temporarily holding a fertilizer and then subjecting it to the blast of air. Further, the movable type of by-piercing-a-nozzle fertilizing device which is equipped with the fertilizer holding means is not limited to the one having the above-mentioned structure.

Next, the blast means will now be described with reference to FIG. 14.

Figure 14:
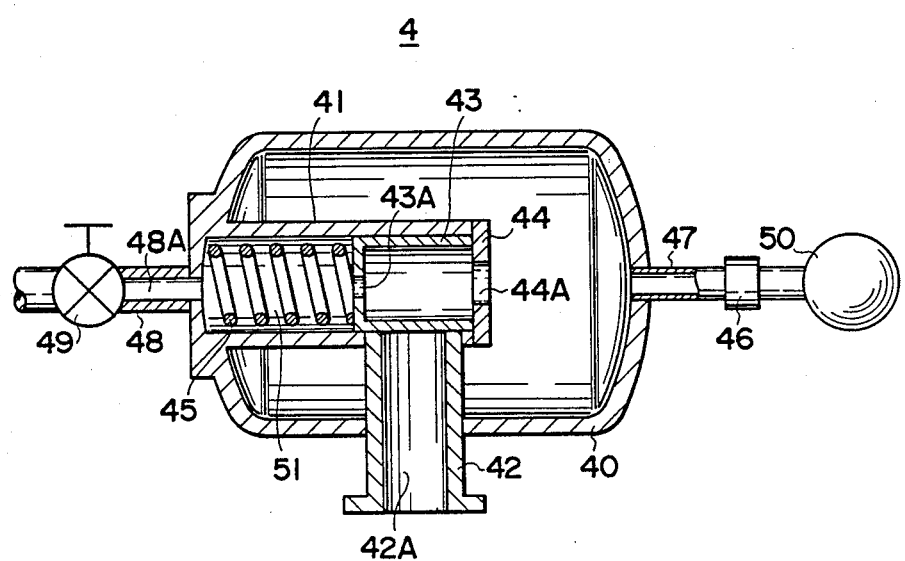
FIG. 14 is a sectional view of a blast means according to the embodiment.

As shown in FIG. 14, the blast means 4 comprises a tank 40, a cylinder 41 provided within the tank 40, an ejection pipe 42 which is communicated with the cylinder 41 and has an ejection outlet 42A communicated with the ventilation pipe 32 of the fertilizer metering means 3, a piston 43 which is slidably supported within the cylinder 41, a spring 45 interposed between the piston 43 and the inner wall surface of the tank 40 and intended to urge the piston 43 toward a closure plate 44, a gas inlet 47 for supplying a compressed air into the tank 40 via a check valve 46, a discharge pipe 48 having an escapement hole 48A communicated with the cylinder 41, and a control valve 49 for controlling the opening and closing of the discharge pipe 48. The closure plate 44 is adapted to close the opening of the cylinder 41 and, at the same time, is formed with a through bore 44A communicated with the interior of the cylinder 41. The piston 43 is formed with a ventilation bore 43A. A compressed gas from a compressed gas source 50 enters the tank 40 and is charged in the same. At the same time, it enters a chamber 51 of the cylinder 41 via the through bore 44A, the interior of the piston 43 and the ventilation bore 43A. When the control valve 49 is opened, the pressure within the chamber 51 decreases with the result that the piston 43 is moved leftwardly of the illustration against the biasing force of the spring 45. As a result, the interior of the tank 40 is allowed to communicate with the ejection pipe 42. Thus, the air is rapidly ejected from the ejection outlet 42A in the form of a blast of air.

In operation, when, as shown in FIG. 1, the handle pipes 21 are depressed down to the position indicated in the two-dot chain lines of FIG. 1 by using the grip pipe 22, the arm member 20 is rocked about the wheel shaft 19 with a point 52 of contact between the wheels 18 and the ground surface 17 as a supporting point. The upper and lower end portions of the arm member 20 are connected to the upper and lower end portions of the cylinder, respectively, as mentioned above. Since the nozzle 1, nozzle striking means 2, fertilizer metering means 3 and blast means 4 are integrally retained by the nozzle drawing-out means 5 via the supporting metal 12, fastening metal 14, bracket 15, etc., the device as a whole which includes the nozzle 1 is rocked and lifted as indicated in two-dot chain line and thus is moved away from the ground surface 17. Thus, it is retained by the wheel 18 via the arm member 20. Thus, it is possible to move the movable device to any place by pushing the wheel 18 by using the grip pipe 22.

The movable by-piercing-a-nozzle fertilizing device 100 is pushed and moved as mentioned above, to a place where the nozzle is required to be pierced into the soil for fertilization. The device is then installed again at the erected posture indicated in solid lines of FIG. 1. Thereafter, an impact force is applied to the nozzle by means of the nozzle striking means 2, whereby the nozzle is driven into the soil by its desired length. Thereafter, a blast of air is supplied from the blast means 4, whereby a specified amount of fertilizer within the fertilizer metering means 3 is sent into the nozzle passage 1B, thereby to inject the fertilizer into the soil by way of the fertilizer injection bore 1A of the nozzle 1. After injection of the fertilizer, the rod 8 of the nozzle drawing-out means 5 is drawn out from within the cylinder, thereby to draw up the nozzle from under the ground. Thus, the device is restored to its original condition. By repeating this operation it is possible to perform the piercing of the nozzle into the soil for fertilizing the same. When it is not desired to move the movable device to another fertilizing quarter of place, it is sufficient to lift the nozzle 1 and the other means in the above-mentioned way and carry the same by use of the wheels 18 to such object quarter of place.

As has been described above, according to the invention, the transfer of the device is effected very easily and conveniently. Further, installation of the device even at a relatively small or narrow zone of place becomes possible. In addition, piercing of the nozzle into the soil for fertilization is effected mechanically and speedily, whereby the fertilizer injection operation with respect to a large number of objects (fruit tree, tea plantation, etc.) can be performed with high efficiency.

The nozzle striking means 2, fertilizer metering means 3, blast means 4 and so forth which have been adopted in the above-mentioned embodiments are only illustrative, and the invention is not limited thereto. Further, the structure of the moving means 6 and the structure wherein the nozzle 1 and other means are connected with and retained by that moving means 6 are nor limited to the ones which have been described in the above-mentioned embodiments. Further, although the handle 38 of the fertilizer metering means 3 and the control valve 49 of the blast means 4 may manually be operated at the actual spot of fertilization, both can of course be operated automatically. Further, supply and non-supply of the compressed gas into each associated means can also be effected on an automatic basis.

As apparent from the foregoing description, according to the invention, injecting a specified amount of fertilizer into the soil is effected smoothly and speedily. Further, transferring the device to a given quarter of place is easily and quickly effected by means of the moving means which is simple in structure. Thus, it is possible to obtain the effect of improving the fertilizer-injecting operation efficiency.

What is claimed is:

1. A movable device for fertilizing soil comprising, in combination:

fertilizing means for fertilizing the soil including:

a nozzle for injecting a specified amount of a fertilizer from a tip end portion thereof into the soil with a blast of air, blast means for generating the blast of air and directing the blast so as to impinge directly on a material in said nozzle to eject a specified amount thereof from said tip end portion of said nozzle, a fertilizer storage chamber, means for conveying a fertilizer from said storage chamber to said nozzle, fertilizer metering means for metering the fertilizer during conveyance thereof from the storage chamber to said nozzle, said fertilizer metering means including a fertilizer holding means having a passage therethrough which is in communication with said nozzle and through which said blast of air is passed, said fertilizer holding means being formed so as to temporarily hold therein said specified amount of fertilizer supplied from said fertilizer storage chamber and to permit said fertilizer to be fed into said passage, said fertilizer metering means comprising an outer case element and an inner case element rotatably supported within said outer case element, said outer case element defining a blast bore operatively coupled to said blast means, a fertilizer bore operatively coupled to said fertilizer storage chamber, and a nozzle bore operatively coupled to the interior of said nozzle, means defining a passage in said inner case element such that in a first position, one end of said passage is in communication with the fertilizer bore and another end opposite to said one end is spaced from said nozzle bore, and in a second position said one end of said passage is in communication with said blast bore and said opposite end of said passage is in communication with said nozzle bore, said passage defined in said inner case element being substantially y-shaped, a first arm of said Y being selectively placed in communication with said fertilizer bore, a second arm of said passage being selectively placed in communication with said blast bore, and a third arm of said passage being placed in communication with said nozzle bore when said second arm communicates with said blast bore, nozzle striking means for applying an impact force to said nozzle to drive said nozzle into the soil, nozzle drawing-out means for drawing said nozzle out of the soil; and moving means for lifting, holding, and moving said fertilizing means.

2. A movable device for fertilizing soil comprising, in combination:

fertilizing means for fertilizing the soil including:

a nozzle for injecting a specified amount of a fertilizer from a tip end portion thereof into the soil with a blast of air, blast means for generating said blast of air and directing the blast so as to impinge directly on a material in said nozzle to eject a specified amount thereof from said tip end portion of said nozzle, a fertilizer storage chamber, means for conveying a fertilizer from said storage chamber to said nozzle, fertilizer metering means for metering the fertilizer during conveyance thereof from the storage chamber to said nozzle, said fertilizer metering means including a fertilizer holding means having a passage therethrough which is in communication with said nozzle and through which said blast of air is passed, said fertilizer holding means being formed so as to temporarily hold therein said specified amount of fertilizer supplied from said fertilizer storage chamber and to permit said fertilizer to be fed into said passage, a ventilation pipe which defines said passage and conducts said blast of air from said blast means to said nozzle, said fertilizer holding means being entirely mounted peripherally of said ventilation pipe and including a cylindrical hollow valve chamber and a fertilizer holding rotor rotatably mounted within said valve chamber, said rotor being closely engaged with an outer periphery of said ventilation pipe so as to be rotatable about the outer periphery of said ventilation pipe, said fertilizer storage chamber being coupled to said fertilizer holding means such that fertilizer is conveyed to said fertilizer holding rotor through inlet bores defined in a top of said valve chamber, said ventilation pipe including at least one through bore selectively communicable with said fertilizer holding rotor, nozzle striking means for applying an impact force to said nozzle to drive said nozzle into the soil, nozzle drawing-out means for drawing said nozzle out of the soil; and moving means for lifting, holding, and moving said fertilizing means.

3. A movable device as in claim 2, wherein said fertilizer holding rotor is substantially cylindrical and defines at least first and second metering chambers each extending from an upper surface of said rotor, passing through said rotor and terminating at an open end at the inner periphery of said rotor so as to be an opposing facing relation, the total volume of each said metering chamber corresponding to a specified amount of fertilizer to be injected, each said metering chamber being selectively placed in communication with said fertilizer storage chamber whereby rotation of said fertilizer holding rotor selectively places a chamber in communication with said fertilizer storage.

* * * * *